United States Patent [19]

Pastorino et al.

[11] 4,207,093
[45] Jun. 10, 1980

[54] PROCESS FOR REDUCING METAL OXIDE CONTAINING ORES

[76] Inventors: Hector F. Pastorino, Campichuelo 900-9° P., Buenos Aires; Manuel D. P. De Meurville, Sierra Grande, Casa D' No 23-Villa Hipasam, Sierra Grande Rio Negro, both of Argentina

[21] Appl. No.: 926,970

[22] Filed: Jul. 21, 1978

Related U.S. Application Data

[63] Continuation-in-part of Ser. No. 737,104, Oct. 29, 1976, abandoned.

[51] Int. Cl.² ............................................. C21B 13/00
[52] U.S. Cl. ........................................ 75/26; 75/0.5 B; 75/0.5 BA; 75/34
[58] Field of Search .................... 75/26, 34, 35, 0.5 B, 75/0.5 BA

[56] References Cited

U.S. PATENT DOCUMENTS 2,702,240  2/1955  Rees et al. ................................. 75/26

Primary Examiner—M. J. Andrews
Attorney, Agent, or Firm—Emory L. Groff, Jr.

[57] ABSTRACT

A method for reducing the metal oxide content of a particulate ore to the metallic state, the ore having a particle size such that at least about 85% thereof will pass through a 200 mesh screen. The particles are entrained within a turbulent stream of reducing gas for the metal oxide for a time and at a temperature sufficient for the reducing gas to react with and reduce the ore to a finely divided metal to at least partially oxidize the reducing gas. The turbulence imparts to the particles sufficient kinetic energy to prevent agglomeration thereof.

5 Claims, 4 Drawing Figures

PROCESS FOR REDUCING METAL OXIDE CONTAINING ORES

This application is a continuation-in-part of Ser. No. 737,104 filed Oct. 29, 1976 now abandoned.

BACKGROUND OF THE INVENTION

The present invention is related to a process for reducing metal oxide containing ores.

The process of the present invention seeks to conduct the said reduction process under very favorable kinetic conditions, at practically instantaneous speed. It is an object of the invention to obtain metallic particles as a final product of the reduction substantially free from agglomerations resulting from the partial sintering of the mineral particles before the reduction.

The known processes for reducing metal oxides in minerals or ores are based on the direct action of reducing agents (except for hydro metallurgical and electrolytic processes) after having exposed previously prepared ore pieces of the proper size, according to the process to be used, to the action of reducing agents (generally carbon, monoxide, hydrogen or a mixture thereof), in such a manner that the reducing agents or their products of reaction are contacted with the mineral, at a temperature adequate for the occurrence of the reduction reaction and for the time necessary for its completion.

Taking as an example the reduction of minerals containing iron oxides, the conventional procedures for processing those containing hematite ($Fe_2O_3$) or magnetite ($Fe_3O_4$) employ any one of the devices: shaft furnace, rotary kiln, fluidized bed, or travelling grate.

A blast furnace is a shaft furnace of great dimensions, through the upper part of which iron ore is fed in pieces of variable size, but containing limited quantitites of sizes smaller than 12,7 mm ($\frac{1}{2}''$) and alternating the ore charges with others composed of carbon in the form of coke and other elements destined to form the slag.

The carbon supplies the reducing agent in the form of carbon monoxide through partial oxidation thereof by the air blown through nozzles at the bottom of the furnace. The oxidation raction also supplies the required heat to attain the temperature of reduction.

The exposure of the ore to the reducing agent at high temperature reduces the iron oxides and produces the fusion of metal and gangue, which are tapped from the lower part of the furnace.

The so-called "direct reduction" processes known as the Midrex, Purofer and Armco processes also use vertical shaft furnaces. The Hyl (Hojalata y Lamina) makes use of vertical reactors in a batch system.

All of these processes use gaseous reducing agents (hydrogen, carbon monoxide or a mixture of both gases obtained from cracking natural gas or other liquid or gaseous hydrocarbons or from the gasification or distillation of coal). These gases, heated at adequate temperature, circulate through the ores in countercurrent fashion, while the latter slowly descend through the shaft furnace (or, in the case of the Hyl process, while the mineral stands in the reactor).

All of these processes require that the ores to be treated be of a relatively large size, or also be previously agglomerated in the form of pellets or briquets.

Procedures using a rotary kiln use solid coal as a reducing agent. The coal is mixed with the ores prior to entering the rotary kiln, or it is projected from the discharge outlet towards different points inside the kiln. As in the case of the blast furnace, the coal supplies the reducing agent (CO) and the reaction heat derived from its oxidation maintains the temperature for reducing the mineral.

The iron ore must be fed in pieces ranging in size from 2 to 20 mm or in the form of pellets from 10 to 15 mm.

Procedures using fluidized beds employ gaseous reductants. The mineral, ground in small and preferably uniformly sized pieces (about 150 to 300 microns), is submitted to the action of ascending reducing gases, the speed of which is such that the particles without being entrained are suspended, and the mineral mass behaves like a fluid.

In procedures using a movable grate the ground mineral is agglomerated (pelletized) together with coal fines and the green pellets conveyed on a circular movable grate while the reducing gas heated to the proper temperature for preheating is passed through the bed of pellets. In successive areas of the circuit the coal reacts with the oxygen in the mineral to reduce the latter followed by cooling.

Of prior art processes and devices used for reducing iron oxide containing minerals, certain general conclusions are self-evident.

(a) Size of the mineral to be processed

The use of small particles, i.e., under a size of 200 mesh (74 microns) is virtually excluded for several different reasons, namely:

In shaft furnaces the presence of fines reduces the permeability of the bed to reducing gases. Use must be made of minerals of granulometry, preferably uniform and large enough so that no fluidization or even entrainment of the particles is produced by the ascending gases.

In rotary kilns the presence of small particles, due to their tendency to agglomeration or sinterizing at the process temperatures, results in the formation of lumps and rings on the furnace walls, hampering their operation. Due to this fact, operations must be carried out at lower than ideal temperatures, thus lowering the speed of the reduction reaction.

In fluidized beds the presence of small particles, the sintering of which alters the fluidization equilibrium, also demands a reduction of the operating temperature, thereby lowering the reaction speed and the system yield.

In the travelling grate system exclusive use is made of pellets in which coal has been incorporated.

As is apparent in all of the known processes for reduction of iron ores, fines constitute undesirable elements of the charge and can only be tolerated within very narrow limits.

However, in all mining and treatment operations, the handling and transportation of dry minerals produces great quantities of small particles or pulverulent fines which, in view of the difficulties pointed out, must be discarded or submitted to costly processes of agglomeration (pelletization, sintering, briquetting) to allow their utilization.

The same problems arise in those instances where minerals containing metal oxides are mixed more or less intametely with impurities and which require intensive grinding to allow the liberation of said metal oxides from the undesirable impurities attached thereto.

(b) Time required for effecting reduction

The use of mineral pieces of relatively large size require exposing the mineral pieces to the action of reducing gases for relatively long periods of time in order to allow completion of the reducing reactions. The reduction, initiated at the surface of each piece of mineral, must continue penetration until the nucleus is reached. These periods of time generally exceed 30 minutes and in some cases they reach up to 12 hours.

(c) Gas volume/mineral volume ratio

At a given moment, the ratio between the reducing gas volume and the mineral volume present in the system is, in the described processes, low. Most of the volume of the reduction system is occupied by the mineral, and the smallest part by the reducing gas circulating among the mineral pieces.

(d) Contact between pieces of mineral

In all of the prior art processes shown, with the exception of those using fluidized beds, the pieces of mineral are in direct contact with each other. This causes not only less exposure to the action of reducing gases, but also, when the temperature rises, a tendency to agglomeration or sinter which, as pointed out above, is detrimental, forcing a limitation as to the temperature and the speed of the reaction.

In fluidized beds, while the particles are smaller and suspended in the gaseous medium, this suspension is incipient and collisions against nearby particles are frequent, so that the risk of sintering still exists.

(e) Displacement of the pieces of mineral

In all the processes cited the pieces of mineral are either standing (as in Hyl system) or in slow movement (by action of gravity in shaft furnaces and fluidized beds, by the combined action of gravity and rotation in rotary kiln, and by the displacement of the grates in the movable grate process). These displacements are in mass, without the particles losing contact with each other and their speed is determined by the time required to complete the reduction of the mineral.

The method which is the object of the present invention permits the utilization, without previous agglomeration, of metal oxides containing ores whenever these are finely divided or in pulverulent condition.

SUMMARY OF THE INVENTION

The invention comprises an oxide reduction process wherein the oxides are in a finely divided condition, i.e., of a granulometry such that at least about 85% thereof will pass through a 200 mesh screen (<74 microns).

The finely ground ore is dispersed in a gaseous medium containing the necessary agents for reduction of the oxides at the temperature of reduction of the oxide component of the ore. The ore may be premixed with finely divided solid reducing agent or an agent which produces a reducing agent in situ during the process.

The gas containing the dispersed fines transports the ore particles through the system in a turbulent flow whereby sufficient kinetic energy is imparted to the particles such that sintering and agglomeration of the fines or resultant metallic particles does not occur during the reduction process.

DETAILED DESCRIPTION OF THE INVENTION

Figure 1:
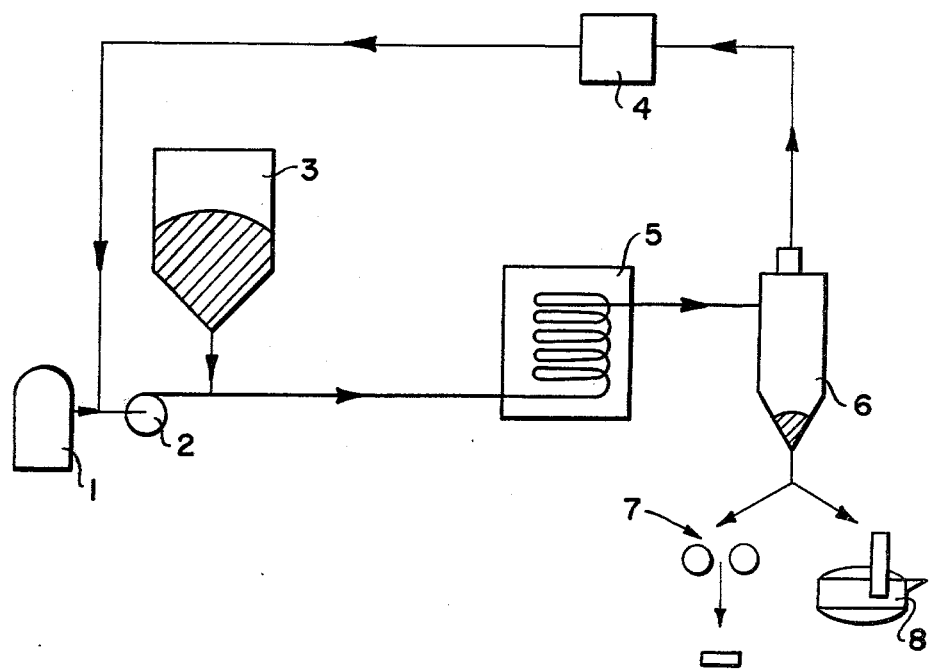
FIG. 1 represents a schematic diagram of a system wherein a gas generator 1 provides the reducing gas, which is compressed by compressor 2. The ground ore is fed to the line from ore deposit 3 by means of a Venturi feeder and is penumatically transported through a heated coil 5 inside a furnace. Cyclone 6 separates the reduced ore, which after cooling (and separation of impurities if need be) is either sent to a briquetting machine 7 or to an electric arc furnace 8. The partially oxidized gas is treated in 4 to eliminate $CO_2$ and $H_2O$ (e.g. by scrubbing) and the excess reducing gas is recirculated to the system.

The correct temperature for the reduction reaction can be obtained: by preheating the mineral, by preheating the gas which contains reducing elements, by heating the medium through which the turbulent stream of gas entraining the mineral forcedly circulates, by reactions between the elements composing the gaseous stream and the solid reducing elements mixed with the mineral, or by a combination of these means. The metal oxide containing mineral, finely ground or in pulverulent state (preheated or not, and mixed or not with solid reducing elements) may descend by gravity in free fall inside a slow speed gas stream (preheated or not) containing reducing elements (or capable of forming reducing element by reaction with the solid reducing elements mixed with the mineral) and obtain the temperature for the reduction reaction in the manner shown in the preceding paragraph.

The reduction reaction of metal oxides is produced in an almost instantaneous manner (a few seconds) because of:

1. The high specific surface of the finely divided or pulverulent mineral;
2. The fact of each individual particle being totally surrounded by a great mass of reducing gas in movement; and
3. By conditions 1 and 2 coinciding with the proper temperatures for the reaction.

Upon reduction, the reduced pulverulent mineral is cooled and, if necessary, submitted to separation of impurities. Finally, it is compacted by a briquetting operation, with the metallized mineral briquettes constituting the final product of the process.

Alternatively, the reduced pulverous mineral is transported, still hot, to melting furnaces from which the liquid metal is obtained and the gangue corresponding to the mineral composition is separated.

After the separation of the reduced pulverulent mineral, the gas containing partially oxidized reducing elements is circulated by systems which absorb or eliminate the reaction products, and then it is re-circulated to the process, with the previous replenishment of adequate amounts of fresh gas, to restart the treatment of new portions of the ore. Part of this recirculated gas can be used as a fuel to supply part of the energy required to maintain reduction temperature.

The following reaction parameters are critical to a successful practice of the invention:

(a) Particle size

The basis of the invention is the dispersion of the ore particles in the gaseous medium in order that each particle be entirely surrounded by reductant, absorbing at the same time from the gas or from the system through which it circulates the caloric energy required for its reduction. Due to this fact, the ore must be finely ground and the particle size must not exceed approximately 85% below 200 mesh (74 microns) in order to have a specific surface high enough to ensure the rapid reduction of the metallic oxides. The smaller the specific surface, the longer will be the time during which the particle must remain in contact with the reducing gases in order to achieve complete reduction. Since the speed of circulation of the ore particles is determined by the conditions of pneumatic transport and cannot be decreased without the risk of sedimentation and plugging, a smaller specific surface will require a longer path in order to increase the residence time.

(b) Ores to be treated

The richness of the ore is not critical to the success of the invention. A higher impurity or gangue content will require a higher energy for grinding and a higher percentage of the caloric energy being used to heat the gangue particles mixed with the oxide particles, lowering the caloric efficiency of the process. Successful runs have been made using practically pure metal oxides and with ores containing 30% or less of metal oxides.

(c) Gaseous vehicles

The following gaseous vehicles may be employed: $H_2$, CO and mixtures $CO/N_2$ and $CO/H_2$. The reducing agent may be produced in situ during the process. The following are examples of suitable reducing systems:

Reduction with $H_2/CO$ mixtures prepared by way of the known methods (catalytic cracking of natural gas, water gas, catalytic reaction between $CO_2$ and $H_2O$, etc.) prior to the dispersion of the ore particles;

Reduction with CO obtained by partial oxidation by the oxygen of the air of the particles of finely divided carbon mixed with the ore and entrained with it through the system;

Reduction with CO obtained by partial oxidation by pure oxygen of the particles of finely divided carbon mixed with the ore and entrained with it through the system;

Reduction with $CO/H_2$ mixture (water gas) obtained in situ by reaction between the particles of finely divided carbon mixed with the ore, and steam used as a conveying medium; taking advantage in this case of the higher reactivity of the hydrogen at the moment of its generation;

Reduction with $CO/H_2$ mixture (water gas) obtained in situ by reaction between the particles of finely divided carbon mixed with the ore and the steam formed by "flashing" of the water which the ore and the carbon are fed into the system in the form of a susension; taking advantage in this case of the higher reactivity of the hydrogen at the moment of generation.

The flow of reducing gas is 100% to 150% greater than that strictly necessary for the reduction of the entrained ore, in order to ensure that the oxide particles are surrounded by reducing gas at all times.

(d) Gas and ore flow through the system

The dispersion of the ore particles in the gaseous vehicle is formed and maintained under the conditions necessary for a pneumatic conveying of low density solids. Under these conditions:

The velocity of the reducing gas is above the mimimum entrainment velocity corresponding to the characteristics of the ore (particle size, specific gravity), to the density of the gas itself and to the geometry of the circuit. Therefore, a turbulent entrainment of the ore particles takes place, with frequent collisions against the red hot circuit walls. The average speed of the ore particles is of the same order of magnitude (if somewhat lower) than the speed of the gaseous vehicle.

As an example, for the hydrogen/hematite system a gas velocity of 45–60 meters/second was found adequate. For the hydrogen/alumina system the required gas speed was found to be of 35–50 meters/second. When using air as a conveying gas, the above speeds could be reduced almost to one third thereof.

(e) Temperature and energy consumption

The caloric energy to be supplied to the solid-gas system in order to achieve reduction depends on:
The metal oxide being reduced;
The reducing gas being used:
The eventual preheating of the ore or of the reducing gas;
The caloric energy absorbed or dissipated in the reaction for the generation in situ of the reducing gas;

The recycling of the spent gas for heating purposes.

The manner in which this caloric energy is applied to the system varies. However, due to the characteristics of the system, it may simply be produced by heating ducts or pipes, and the temperature is easily controlled and held constant. It is also possible to vary the temperature along the system path, in order to maintain a predetermined temperature profile which the particles should traverse during the reduction process, with a final cooling section (always in a reducing atmosphere) to avoid particle reoxidation. The excess of reducing gas contained in the spent gas is submitted to dust separation and scrubbing to eliminate $CO_2$ and water from the reduction process and is fed back to the system. It is partially mixed with fresh reducing gas, and partially used as a fuel to maintain the temperature required by the system. The proportions in which the spent gas is recirculated or burned depend on the economic conditions in each particular case.

EXAMPLE 1

Mineral: Hematite (iron oxide); Analysis:
  Fe (total): 60.34
  $Fe^{++}$: 3.75
  $SiO_2$: 1.20
  p: 0.866
  $Al_2O_3$: 6.90
  S: 0.47
  CaO: 3.69
Granulometry:
  88% below 200 mesh
  60% below 400 mesh
Conduction:
  By galvanized steel pipe of 2.5 cm diameter.
Mineral Feeding:
  By Venturi with ejector.
Heating:
  A muffled kiln was used, heated by fuel-oil, inside which a 12-turn coil made of 2.5 cm galvanized steel pipe was installed, with a total length of about 58 meters. The temperature control was effected by thermocouple and optical pyrometer.
Gas Separation:
  This was carried out by means of a 200 mm diameter cyclone. The product was collected in a closed container, to which a slight overpressure of nitrogen was applied to prevent reoxidations.
Operating data:
  Mineral feed: 150 kg/hour
  Reducing gas (hydrogen) speed: 45 m/sec
  Reducing gas flow rate: 1,5 $m^3$/minute
  Heating temperature: 850° C.

The processed material was analyzed to determine the metallic iron and total iron contents, with the following results:
  Total Fe: 80.24%
  Metallic Fe: 72.23%
from which the following results:
  Reduction degree=0 removed/0 total=93%
  Metallization degree=Metallic Fe/Total Fe=90%
Remarks:
  The consumption of reducing gas (without recirculation) reached to 600 $m^3$/ton of mineral or 889 $m^3$/ton of iron content, which is equivalent to about a 50% excess relative to theoretical consumption.
  The efficiency of the cyclone used was low, with losses of fines in the order of 8–10%.

EXAMPLE 2

The same circuit of Example 1 was used;
  Mineral: pure alumina ($Al_2O_3$)
  Granulometry: 96% below 325 mesh.
Operating Data:
  Mineral feed: 72 kg/hour
  Reducing gas (hydrogen) speed: 36 m/sec
  Reducing gas flow rate: 1.20 $m^3$/minute
  Heating temperature: 1000° C.

The processed matterial was analyzed to determine the free aluminum and remaining alumina contents, with the following results:
  Metallic: 96%
  $Al_2O_3$: 3.7%
Consequently:
  Metallization degree=metallic Al/total Al=98%
Remarks:
  The reducing gas consumption (without recirculation) reached to 1000 $m^3$/ton of alumina, or 1893 $m^3$/ton of metallic aluminum contents, equivalent to about 50% excess with respect to the theoretical consumption.
  The losses of fines material due to inefficiency of the cyclone were in the order of 10%.

EXAMPLE 3

The same circuit, as in Example 1, was used, replacing the reducing gas stream by an air stream.
Mineral:
  There was used a mixture of hematite (of the same analysis and granulometry of Example 1) with charcoal, finely divided (94% below 325 mesh) in a ratio of 40% charcoal and 60% mineral by weight.
Operating data:
  Mixture feeding: 60 kg/hour
  Air speed: 45 m/sec
  Air flow rate: 1.5 $m^3$/minute
  Heating temperature: 950° C.
The analysis of the collected material gave the following results:
  Total Fe: 77.2%
  Metallic Fe: 61.8%
Consequently:
  Metallization degrees=metallic Fe/total Fe=approximately 80%.

Iron ore and charcoal, both in finely divided form, may be fed to the system using superheated steam as the gaseous vehicle. The steam entrains the ore and carbon particles, and circulating through the system at high temperature (950° C.), the C and $H_2O$ react forming CO and $H_2$, which immediately reduce the iron oxides to metal.

As an extension of the above method, the ore and carbon mixture may be fed in a water suspension form into a reaction chamber held at high temperaure. The steam produced by flashing in the reaction chamber reacts with the carbon particles in the same way as explained in the previous paragraph, and the gases so formed reduce the metal oxide particles.

EXAMPLE 4

Figure 3:
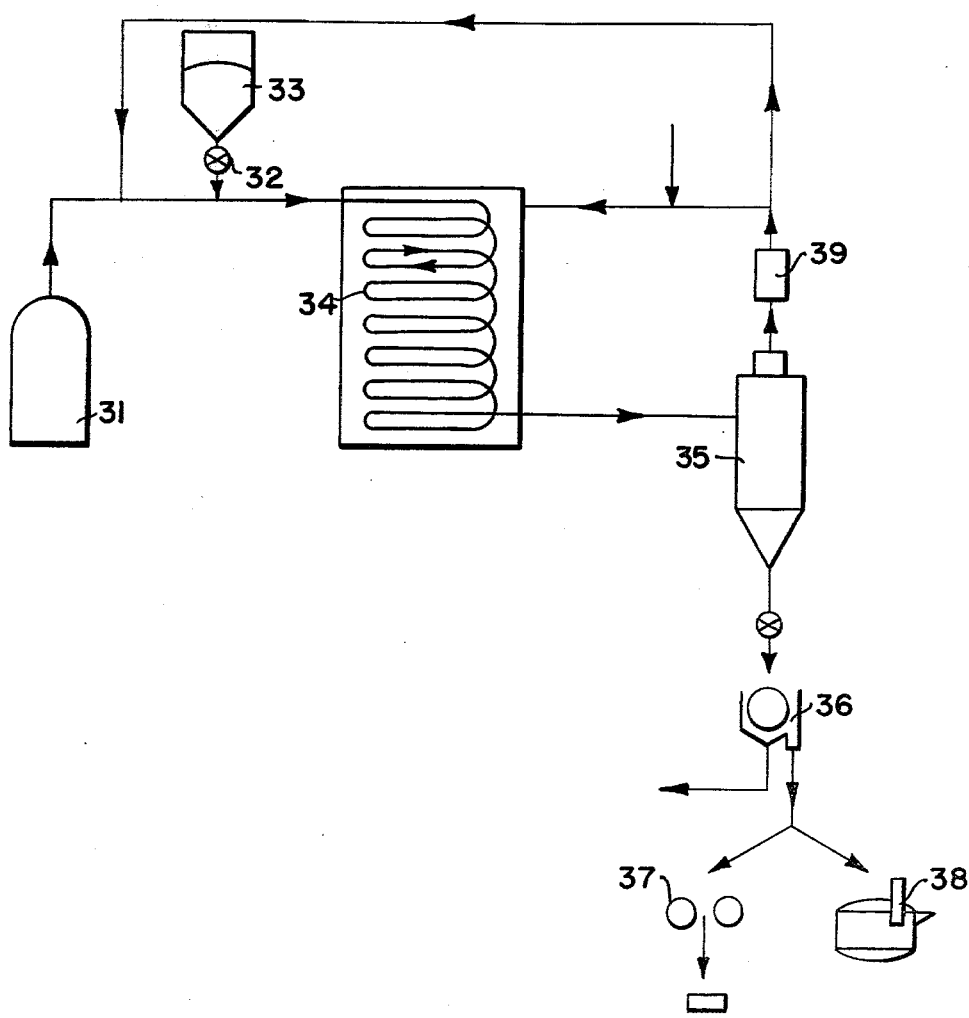
FIG. 3 represents a schematic diagram of a system wherein the intial gas stream is steam generated by boiler 31 which by means of a feeder 32 entrains the ground ore mixed with carbon from deposit 33. The mixture is entrained through a heated coil 34 inside a furnace, where the steam reacts with carbon to form water gas, and the latter with the ore achieving reduction. Cyclone 35 separates the reduced ore, which after cooling and separation of impurities at separator 36 is either sent to a briquetting machine 37 or to an electric arc furnace 38. The partially spent water gas is treated in 39 to eliminate $CO_2$ and $H_2O$ by scrubbing and cooling, and then is partially recirculated to the system and partially used as a fuel to maintain reduction temperature in the furnace.
Figure 2:
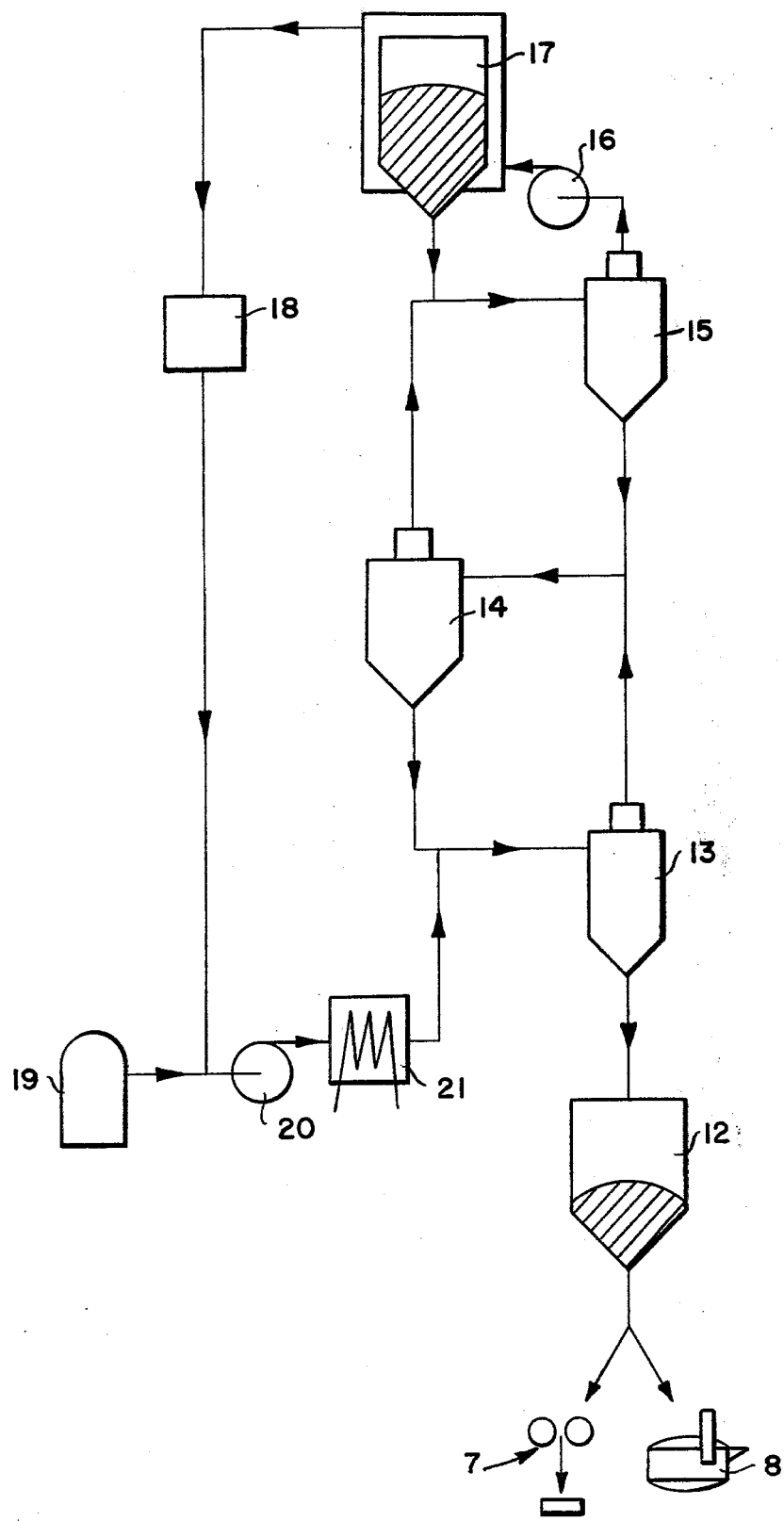
FIG. 2 represents a schematic diagram of a system wherein a gas generator 19 provides the reducing gas, which is compressed by compressor 20 and heated to slightly above reduction temperature by gas heater 21. The ground ore is fed from preheated ore deposit 17 to the entrance duct to cyclone 15 and successively descends through cyclones 14 and 13 as it is picked up by the ascending hot gas stream. It is finally collected at a bin 12, to be either briquetted at 7 or fed to an electric arc furnace 8. Blower 16 helps maintain the gas flow through the system. Partially spent gas is treated at 18 to eliminate $CO_2$ and $H_2O$ and is then recirculated to the heater or used as a fuel to maintain gas temperature.

The circuit used corresponds to the features shown in FIG. 3. The heated coil was made of 52 meters of ¾" steel pipe placed inside an electric furnace. A small boiler supplied steam at approximately 4,5 $Kg/cm2$, which was superheated by circulating through a pipe inside the same furnace.

Mineral: There was used a mixture of hematite (of the same analysis and granulometry of Example 1) and charcoal finely divided (94% below 325 mesh) in the proportions of 35,9% of charcoal and 64,1% of ore by weight.

Operating data:
 Rate of mixture feeding: 99.4 Kg/hour
 Steam rate: 53.5 Kg/hour
 Steam speed: 18.3 m/sec
 Steam temperature (before super-heating): 260° C.
 Furnace temperature: 1.050° C.

The analysis of the collected material (without gangue separation) gave the following results:
 Total Fe: 79.0%
 Metallic Fe: 71.9%

Consequently:
 Reduction degree=0 removed/0 total=91.9%
 Metallization degree=Metallic Fe/Total Fe=91.0%

EXAMPLE 5

Figure 4:
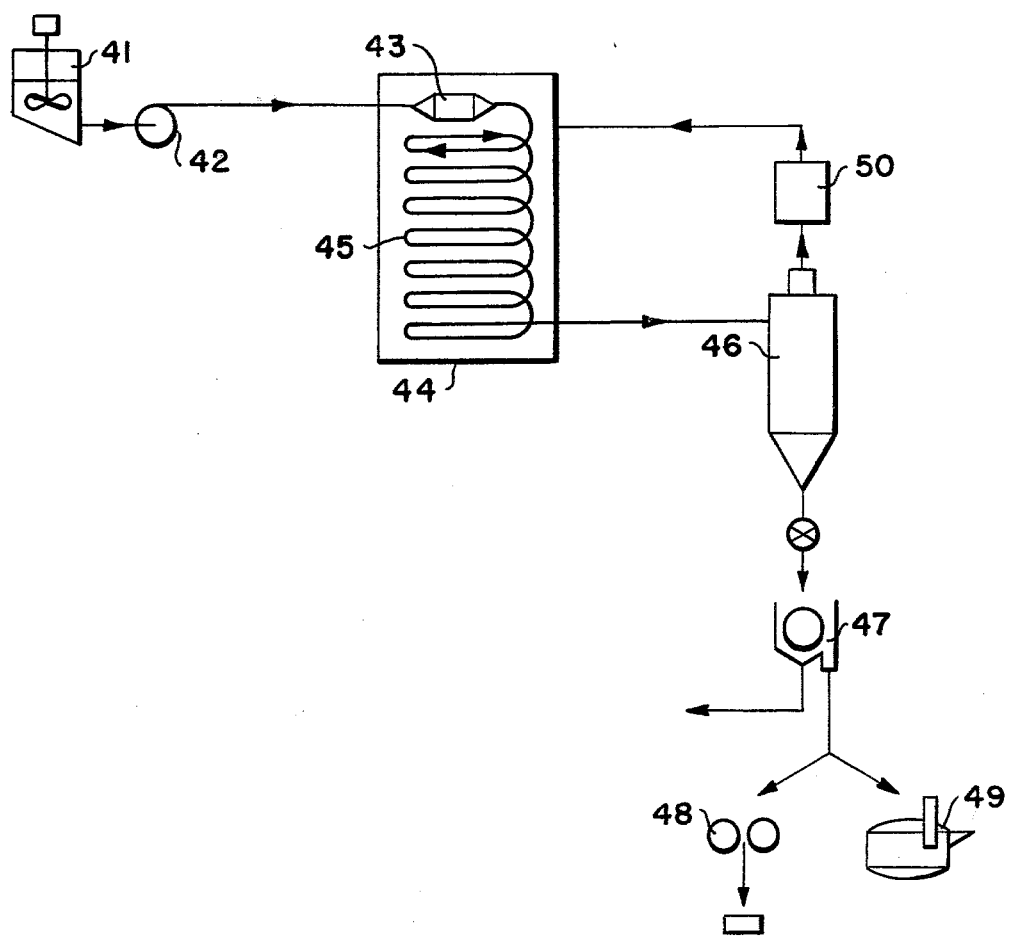
FIG. 4 represents a schematic diagram of a system wherein the ground ore, mixed with finely ground carbon is maintained in the form of a slurry by mixing the solids with water in an agitated tank 41. Pump 42 feeds the slurry at a controlled rate into a reaction chamber 43 inside the furnace 44, wherein the water flashes into steam, the steam reacting with carbon to form water gas and the latter reducing the ore particles in the course of its pneumatic transport through the heated coil 45. Cyclone 46 separates the reduced ore particles, which after cooling and separation of impurities at separator 47 are either sent to a briquetting machine 48 or to an electric arc furnace 49. The partially spent water gas is treated in 50 to elminate $CO_2$ and $H_2O$ by scrubbing and cooling and then is used as fuel to maintain reduction temperature at furnace 44.

The circuit used corresponds to the general features shown on FIG. 4. The heated coil was the same Example 4 to which a heated reaction chamber was added. The incoming gas stream was replaced by a flow of slurry.

Mineral:
 There was used a slurry obtained by mixing hematite ore (of the same analysis and granulometry of Example 1) with finely divided charcoal (94% below 325 mesh) and water in the porportions of 23,3% charcoal, 41,7% of hematite ore and 35% of water, by weight.

Operating data:
 Rate of slurry feed (65% solids): 0.30 m3/hour
 Furnace temperature: 1.050° C.

The analysis of the collected material (without gangue separation) gave the following results:
 Total Fe: 78.5%
 Metallic Fe: 69.7%

Consequently:
 Reduction degree=0 removed/=0 total=90.0%
 Metallization degree=Metallic Fe/Total Fe=88.8%

The process of the invention permits:

(a) An operative process which is stable and continuous can be established without difficulties for production of metals from their finely divided oxides.

(b) The utilization of fines and this is attained without costly agglomerating operations.

(c) The reaction speed to is very high, allowing the installation of high production systems, with very low inertia and with apparatus of dimensions comparatively much smaller than those of apparatus which have to contain and treat very large volumes.

(d) The reducing gas production system, for example, the catalytic cracking of natural gas, can be assimilated to any of those industrially employed with the same purpose in various industries.

(e) The economical advantage of the process is assured by the recirculation of the partially oxidized reducing gas, the use of hot gases in mineral preheating, etc.

What is claimed is:

1. A method for reducing the metal oxide content of a particulate ore to the metallic state, said particulate ore having a particle size such that at least about 85% thereof will pass through a 200 mesh screen, comprising entraining said particles within a turbulent stream of reducing gas for said metal oxide for a time and at a temperature sufficient for said reducing gas to react with and to reduce said ore to a finely divided metal, thereby at least partially oxidizing said reducing gas, the said turbulence being sufficient to impart to said particles a kinetic energy sufficient to prevent agglomeration thereof.

2. The method of claim 1 wherein said gas contains hydrogen and/or carbon monoxide.

3. The method of claim 1 wherein said ore additionally contains carbon and is initially entrained in air and said reducing gas stream is formed in situ by reaction of the oxygen in the air with said carbon.

4. The method of claim 1 wherein said ore additionally contains carbon and is initially entrained in steam and said reducing gas stream is formed in situ by reaction of the steam with said carbon.

5. The method of claim 1 wherein said ore additionally contains carbon and both ore and carbon are mixed with water to form a slurry and the reducing gas stream is formed in situ by flash evaportion of the water and the reaction of the steam with said carbon.

* * * * *